United States Patent Office 2,786,013
Patented Mar. 19, 1957

2,786,013

EMULSIFIER COMPOSITIONS AND INSECTICIDAL EMULSIONS

Robert W. Behrens, Stanton, Del., assignor to Atlas Powder Company, Wilmington, Del., a corporation of Delaware No Drawing. Application July 6, 1953,
Serial No. 366,372

9 Claims. (Cl. 167—43)

This invention relates to insecticides and more particularly to emulsifiable insecticidal concentrates containing toxaphene as the active ingredient.

Toxaphene is a chlorinated camphene containing from 67 to 69% chlorine which is widely used as an agricultural insecticide. It is used both for treatment of plants, particularly cotton and forage crops, and livestock where it may be employed either in the form of a dip or a spray. For convenience in application and control of dosage it is convenient to employ toxaphene in the form of aqueous emulsions.

It is an object of the present invention to provide novel emulsifier compositions.

Another object is to provide emulsifiers particularly adapted to use in agricultural emulsions containing toxaphene.

A further object is to provide readily emulsifiable toxaphene concentrates.

A still further object is to provide emulsifiable compositions of toxaphene which form stable emulsions in water of widely varying hardness.

The above and other objects will become more apparent in the course of the following description of the invention and in the appended claims.

Emulsifiable insecticidal compositions which are in accordance with the invention contain toxaphene, a hydrocarbon diluent and a novel emulsifier to be more fully described hereinbelow. Toxaphene is a waxy solid material which may be rendered sufficiently fluid to prepare emulsifiable concentrates by incorporation of hydrocarbon solvents. Suitable solvents include light petroleum fractions, kerosene being particularly suitable, naphthenes or alkylated naphthenes, and aromatic hydrocarbons, particularly xylene and other alkylated benzenes.

Such solutions of toxaphene are rendered emulsifiable in accordance with this invention by combining them with a novel mixed emulsifier which comprises a lauric acid amide of an anhydrized methyl glucamine and an ester of an ether-alcohol.

The acid amides of anhydrized methyl glucamines may be readily prepared by condensation reaction between one or more molar proportions of lauric acid and N-methyl glucamine. If the condensation is effected at temperatures above about 160° C. and preferably in the range 175° to 200° C. elimination of water between hydroxyl groups of the hexityl radical occurs to form heterocyclic rings. The lauric acid reacts preferentially with the amino group to form an amide. Part of the lauric acid, particularly if more than one molar proportion is employed, is consumed by esterfication with some of the hydroxyl radicals. A particularly preferred amide has been prepared as follows:

Example 1

25.25 pounds of a commercial lauric acid were charged into a reaction kettle provided with means for agitation and heating. The acid was heated to 175° C. and 24.8 pounds of methyl glucamine were added over a period of 30 minutes while maintaining the charge temperature above 160° C. The temperature was then raised to 190° C. gradually over a period of 1 hour and held at that temperature for 15 minutes. The charge was then cooled and drummed 1 hour later at 103° C. The product was a viscous liquid exhibiting the following analytical values:

Hydroxyl number=553
Saponification number=55
Acid number=12.8

In the particular example described above approximately 1.75 mols of water were removed per mol of lauric acid. About 1 mol of this is water of condensation from the acid reaction and the balance is water of anhydrization. Useful heterocyclic amides are obtained when from .5 mol to 1.5 mols of water, in addition to the water formed by lauric acid reaction, has been driven off. It is to be recognized that instead of pure lauric acid, commercially available acid mixtures rich in lauric acid, such for example as coconut oil fatty acids, may be employed in preparing the amide component of the emulsifier.

The second component of the mixed emulsifier of the invention is an ester of an aliphatic ether-alcohol. The acyl radical of said ester is furnished by oleic acid, tall oil, or the mixed fatty acids of tallow. The preferred esters are tall oil esters and, in the following, the invention will be described in terms of such esters. It is to be understood that other named fatty acid esters, i. e., the oleates and tallow acid esters may be similarly employed.

The alcohol radicals of the named esters are polyoxyethylene ethers of polyhydric alcohols containing from 2 to 6 carbon atoms. Among such polyhydric alcohols may be named ethylene and propylene glycols, glycerol, the hexitols and anhydrides thereof, particularly sorbitol and sorbitan. The degree of oxyethylation is related to the number of acyl radicals combined per mol of ether-alcohol. In general, the ether-alcohol residue should contain from 8 to 18 oxyethylene groups per acyl radical of the ester. Exemplary esters of ether-alcohols conforming to this definition include the following:

Nonaethylene glycol monooleate
50-oxyethylene sorbitol hexa tall oil ester
40-oxyethylene sorbitol tetra tallow acids ester
30-oxyethylene glycerol dioleate
75-oxyethylene sorbitol hexaoleate
16-oxyethylene propylene glycol mono tall oil ester
15-oxyethylene ether of sorbitan mono tall oil ester
20-oxyethylene mannitan di tallow acids ester In the above tabulation the number affixed to "oxyethylene" by a hyphen indicates the number of oxyethylene groups in the ether-alcohol radical. The last two members of the list illustrate the fact that the polyoxyethylene chains may either be introduced into a preformed partial ester of a polyhydric alcohol or may be reacted with the alcohol prior to esterification.

Preferred esters of the class defined are poly tall oil esters of higher polyoxyethylene ethers of hexitols and particularly tetra to hexa tall oil esters of polyoxyethylene ethers or sorbitol containing from 8 to 10 oxyethylene groups per tall oil acyl radical.

The mixed emulsifiers of the invention contain from 30% to 45% by weight of the aforesaid lauric acid amide and from 70% to 55% of an ester of an ether-alcohol as above defined. They may be prepared by simple mixing of the components, with warming if desired to hasten complete mixing.

Toxaphene concentrates may be prepared by combining the emulsifier components, toxaphene and hydrocarbon solvent in any desired order. Conveniently, the toxaphene is dissolved in hydrocarbon and the mixed emulsifier added. It is equally satisfactory, however, to dissolve the emulsifier components, separately or premixed, in the hydrocarbon and then dissolve toxaphene in the mixture.

The preparation of illustrative mixed emulsifiers is shown in the following examples.

*Example 2*

An emulsifier was prepared by weighing together 148 gms. of the product of Example 1 and 252 gms. of 50-oxyethylene sorbitol hexa tall oil ester into a pint jar which was loosely closed and set in a hot water bath at 75° C. After a half hour the jar was closed and shaken by hand to mix the ingredients. A clear homogeneous fluid resulted which is an excellent emulsifier for toxaphene-in-kerosene concentrates.

*Example 3*

Employing the same procedure as in Example 2 a mixed emulsifier is prepared by combining 200 gms. of a mono lauramide of anhydrized N-methyl glucamine in which a total of 2 mols of water has been driven off and 200 gms. of 16-oxyethylene ether of sorbitan mono tall oil ester.

*Example 4*

Again employing the procedure of Example 2 a mixed emulsifier is prepared from 180 gms. of the product of Example 1 and 220 gms. of the tetraoleate of 40-oxyethylene sorbitol.

*Example 5*

120 gms. of the product of Example 1 and 380 gms. of dodecaethylene glycol mono tall oil ester are mixed by the process of Examples 2 to 4, yielding a mixed emulsifier suitable for preparing toxaphene concentrates.

The emulsifiable concentrates of the invention contain from 45% to 72% by weight of toxaphene, from ¼ to ¹⁄₁₂ as much mixed emulsifier as toxaphene, the balance being selected from the before-mentioned hydrocarbon solvents.

Specific compositions exemplifying such concentrates are presented below:

*Example 6*

To a solution of 45 parts by weight of toxaphene in 50 parts by weight of kerosene there is added 5 parts by weight of the product of Example 4. The mixed emulsifier dissolves readily in the toxaphene solution to yield a concentrate which emulsifies easily when dispersed in 10 to 20 times its own volume of water. The stability of the emulsion is virtually unaffected by hardness in the diluting water in the range of 0 to 1000 p. p. m. hardness.

*Example 7*

To a solution of 60 parts by weight of toxaphene in 35 parts by weight of kerosene there is added 5 parts by weight of the product of Example 2. The mixed emulsifier dissolves readily in the toxaphene solution to yield an easily emulsifiable toxaphene concentrate for the production of agricultural insecticide sprays.

*Example 8*

60 parts by weight of toxaphene are dissolved in 26 parts of kerosene. To the solution is added 14 parts of the product of Example 3. The resulting concentrate yields very stable emulsions of fine particle size when diluted with 145 to 150 times its volume of water to form a livestock dip.

*Example 9*

An emulsifiable concentrate of higher toxaphene content is prepared by dissolving 72 parts toxaphene in 20 parts of xylene and incorporating therein 8 parts of the product of Example 5.

The above examples are illustrative only and are not to be construed as limiting the invention.

An especially valuable characteristic of the emulsifiers of the invention is that they confer on toxaphene emulsions a stability which is unaffected by the hardness of water used in preparing the emulsion. Toxaphene concentrates made in accordance with the invention are therefore very versatile, and a single formulation can be employed for use in areas where the water is very hard and in areas where the water is soft.

What is claimed is:

1. An emulsifier composition consisting essentially of from 30% to 45% by weight of a lauric acid amide of anhydrized methyl glucamine and from 70% to 55% by weight of an ester of a polyoxyethylene ether of a 2 to 6 carbon unsubstituted aliphatic polyhydric alcohol, wherein the acyl portion of said ester is selected from the group consisting of oleyl radicals, the mixed acyl radicals of tall oil, and the mixed acyl radicals of tallow acids, and wherein the ether-alcohol radical contains from 8 to 18 oxyethylene groups per acyl radical of said ester.

2. An emulsifier composition as in claim 1 wherein the said ester is a tetra to hexa tall oil ester of a polyoxyethylene ether of sorbitol containing from 8 to 10 oxyethylene groups per tall oil acyl radical.

3. An emulsifier composition as in claim 2 wherein the said ester is a hexa tall oil ester of 50-oxyethylene sorbitol.

4. An emulsifier composition as in claim 3 wherein the said lauric acid amide contains one lauric acid residue per anhydrized glucamine residue, and wherein the degree of anhydrization is that represented by the loss of from 0.5 to 1.5 mols of water from the hexityl radical of the glucamine.

5. An emulsifier composition as in claim 1 wherein the said ester is a polyoxyethylene ether of sorbitan mono tall oil ester containing 16 oxyethylene groups per mol.

6. An emulsifiable insecticidal concentrate consisting essentially of from 45% to 72% by weight of toxaphene, from ¼ to ¹⁄₁₂ as much emulsifier as toxaphene, and the balance a hydrocarbon solvent, wherein the emulsifier is a composition as defined in claim 1.

7. An emulsifiable insecticidal concentrate consisting essentially of about 60% by weight toxaphene, from 5% to 15% of emulsifier and the balance, to 100%, kerosene, wherein the emulsifier is a mixture of from 30% to 45% by weight of a lauric acid amide of anhydrized N-methyl glucamine and from 70% to 55% by weight of a tetra to hexa tall oil ester of a polyoxyethylene ether of a hexitol containing from 8 to 10 oxyethylene groups per tall oil acyl radical.

8. An emulsifiable insecticidal concentrate as in claim 7 wherein the said ester is the hexa tall oil ester of 50-oxyethylene sorbitol.

9. An emulsifiable insecticidal concentrate as in claim 8 wherein the said lauric acid amide contains one lauric acid residue per anhydrized glucamine residue and wherein the degree of anhydrization is that represented by the loss of from 0.5 to 1.5 mols of water from the hexityl radical of the glucamine.

References Cited in the file of this patent

UNITED STATES PATENTS

| | | |
|---|---|---|
| 1,994,467 | Flint et al. | Mar. 19, 1935 |
| 2,442,972 | Edelstein | June 8, 1948 |
| 2,560,626 | Boissonou et al. | July 17, 1951 |
| 2,653,932 | Schwartz | Sept. 29, 1953 |
| 2,667,478 | Schwartz | Jan. 26, 1954 |

FOREIGN PATENTS

| | | |
|---|---|---|
| 1,032,225 | France | Mar. 25, 1953 |